United States Patent
Recio, III et al.

(10) Patent No.: US 9,598,631 B2
(45) Date of Patent: Mar. 21, 2017

(54) SULFONATED RELATIVE PERMEABILITY MODIFIERS FOR REDUCING SUBTERRANEAN FORMATION WATER PERMEABILITY

(71) Applicant: Halliburton Energy Services, Inc., Houston, TX (US)

(72) Inventors: Antonio Recio, III, Humble, TX (US); Larry Steven Eoff, Porter, TX (US); Baireddy Raghava Reddy, Houston, TX (US); Christopher Austin Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/108,196

(22) PCT Filed: Mar. 5, 2015

(86) PCT No.: PCT/US2015/018925
§ 371 (c)(1),
(2) Date: Jun. 24, 2016

(87) PCT Pub. No.: WO2016/140674
PCT Pub. Date: Sep. 9, 2016

(65) Prior Publication Data
US 2017/0002262 A1 Jan. 5, 2017

(51) Int. Cl.
*E21B 43/22* (2006.01)
*E21B 33/138* (2006.01)
(Continued)

(52) U.S. Cl.
CPC ............ *C09K 8/882* (2013.01); *C08F 220/34* (2013.01); *C09K 8/82* (2013.01); *E21B 33/138* (2013.01); *C08F 2810/10* (2013.01)

(58) Field of Classification Search
CPC ........ C09K 8/508; C09K 8/5083; C09K 8/68; C09K 8/5086; C09K 8/514; C09K 8/035;
(Continued)

(56) References Cited

U.S. PATENT DOCUMENTS 6,228,812 B1 5/2001 Dawson et al.
6,476,169 B1 11/2002 Eoff et al.
(Continued)

FOREIGN PATENT DOCUMENTS

WO 2013/091023 A2 6/2013

OTHER PUBLICATIONS

International Search Report and Written Opinion issued in related PCT Application No. PCT/US2015/018925 mailed Sep. 30, 2015, 9 pages.
(Continued)

*Primary Examiner* — Zakiya W Bates
(74) *Attorney, Agent, or Firm* — Craig Roddy; Baker Botts L.L.P.

(57) ABSTRACT

Compositions and methods for treating a water and hydrocarbon producing subterranean formation to reduce the water permeability of the formation without reducing the hydrocarbon permeability of the formation are provided. In one embodiment, the method includes providing a treatment fluid including a base fluid and a relative permeability modifier including a polymer of at least one hydrophilic monomer and at least one hydrophobically modified hydrophilic monomer, wherein the polymer includes a sulfonate moiety, and introducing the treatment fluid into at least a portion of a subterranean formation.

17 Claims, 2 Drawing Sheets

(51) Int. Cl.
    *C09K 8/508*     (2006.01)
    *C09K 8/68*     (2006.01)
    *C09K 8/88*     (2006.01)
    *C09K 8/82*     (2006.01)
    *C08F 220/34*     (2006.01)

(58) Field of Classification Search
    CPC ...... E21B 33/138; E21B 43/26; E21B 21/003;
                                        E21B 43/025; E21B 43/25
    See application file for complete search history.

(56) References Cited

U.S. PATENT DOCUMENTS

| | | |
|---|---|---|
| 8,413,719 B2 | 4/2013 | Milne et al. |
| 2005/0000694 A1 | 1/2005 | Dalrymple et al. |
| 2005/0178549 A1 | 8/2005 | Eoff et al. |
| 2007/0062697 A1 | 3/2007 | Barbosa et al. |
| 2012/0264885 A1 | 10/2012 | Eoff et al. |
| 2012/0279704 A1 | 11/2012 | Eoff et al. |

OTHER PUBLICATIONS

Ladutko, Alex, et al. "Field Application Results of Water Permeability Modifier in Fracture Stimulation Treatments in Western Siberia." SPE Paper 158389, SPE Annual Technical Conference and Exhibition. Society of Petroleum Engineers, 2012.

SULFONATED RELATIVE PERMEABILITY MODIFIERS FOR REDUCING SUBTERRANEAN FORMATION WATER PERMEABILITY

CROSS-REFERENCE TO RELATED APPLICATION

The present application is a U.S. National Stage Application of International Application No. PCT/US2015/018925 filed Mar. 5, 2015, which is incorporated herein by reference in its entirety for all purposes.

BACKGROUND

The present disclosure relates to compositions and methods for use in subterranean operations.

The unwanted production of water from hydrocarbon-producing wells constitutes a considerable technical problem and expense in oilfield operations. When a subterranean formation contains water in significant amounts, water's higher mobility often allows it to flow to a well bore penetrating the formation by way of natural and manmade fractures and high permeability zones. If the ratio of recovered water to recovered hydrocarbons becomes sufficiently large, the cost of separating the water from the hydrocarbons and disposing of it can become a barrier to continued production. This can lead to abandonment of a well penetrating a subterranean formation, even when significant amounts of hydrocarbons remain therein.

In order to reduce the undesired production of water from hydrocarbon-producing subterranean formations, aqueous-soluble polymer systems containing crosslinking agents have been utilized in the art to enter water-containing zones of the formation and block the flow of water therefrom. Selective placement of these crosslinked polymers in a subterranean formation and stability therein represent significant technical challenges that have somewhat limited their use. A more recent strategy to reduce water production from a subterranean formation has been to utilize agents known as relative permeability modifiers. As used herein, the term "relative permeability modifier" refers to a polymer that selectively reduces the effective permeability of a subterranean formation to water-based fluids. Such relative permeability modifiers are capable of significantly reducing the flow of water from a subterranean formation while having a minimal effect on the flow of hydrocarbons. The use of relative permeability modifiers does not generally necessitate the use of zonal isolation techniques that are often employed with crosslinked polymers.

BRIEF DESCRIPTION OF THE DRAWINGS

These drawings illustrate certain aspects of some of the embodiments of the present disclosure, and should not be used to limit or define the claims.

Figure 1:
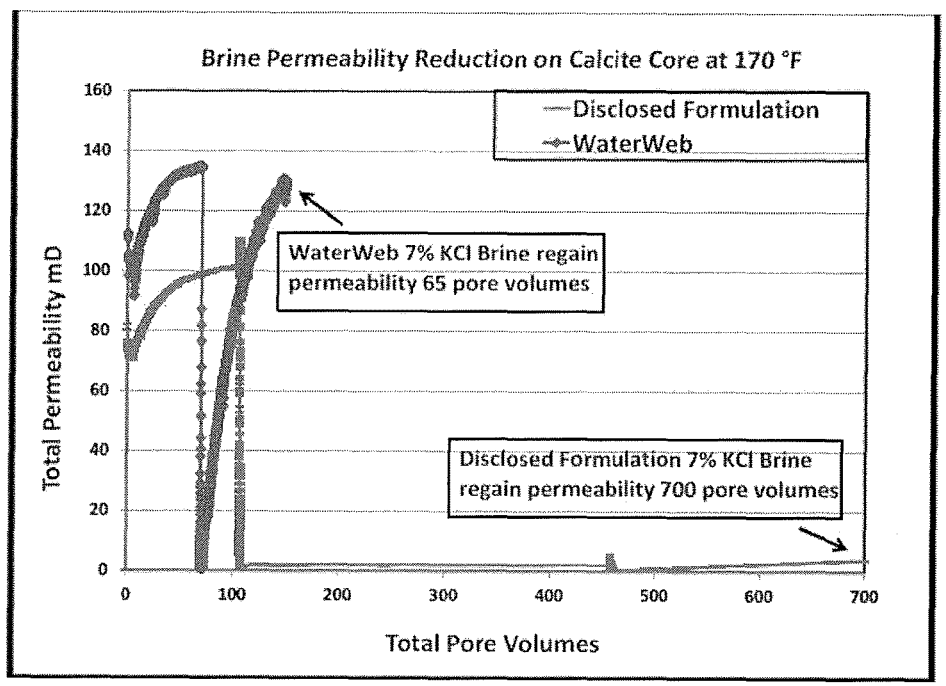
FIG. 1 is a graph illustrating brine permeability on 99% calcite core at 170° F. for an underivatized, hydrophobically-modified PolyDMAEMA, the active ingredient in the Halliburton WaterWeb® Service as compared to one example of a relative permeability modifier of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean operations, and more specifically, compositions and methods for treating a water and hydrocarbon producing subterranean formation to reduce the water permeability of the formation without substantially reducing the hydrocarbon permeability of the formation.

One obstacle to the use of relative permeability modifiers in subterranean formations is that the performance of relative permeability modifiers may be affected by the type of formation or reservoir and/or the temperature of the formation or reservoir. For example, certain relative permeability modifiers that may be effective to reduce water production in subterranean formations with sandstone surfaces may not perform as well in carbonate formations or reservoirs, which contain carbonate rock surfaces. Certain relative permeability modifiers also may not perform well at elevated temperatures over the long-term. Certain embodiments of the present disclosure may avoid these issues.

The present disclosure provides compositions for relative permeability modifiers and methods which may be used to reduce water production in subterranean formations, and in particular, formations containing carbonate rock surfaces (carbonate formations).

The relative permeability modifiers in accordance with the present disclosure are generally hydrophobically-modified hydrophilic polymers that have been functionalized to include at least one sulfonate moiety. Without limiting the disclosure to any particular theory or mechanism, it is believed that in certain embodiments, the sulfonate moiety of the relative permeability modifiers serves as an anchoring group that may slow the rate of polymer desorption from carbonate rock surfaces. Moreover, without limiting the disclosure to any particular theory or mechanism, it is believed that in certain embodiments, the sulfonate moiety, due to its electrostatically repulsive nature, may elongate the polymer and allow for carboxylate groups that may be present on the polymer backbone of the relative permeability modifier to more favorably interact with carbonate rock surfaces. In addition, it is also believed that in certain embodiments, an otherwise cationic charge of a relative permeability modifier may be masked by the addition of an anionic sulfonate moiety, and thus, may allow the relative permeability modifier to perform better on carbonate rock surfaces, which are generally cationic.

The relative permeability modifiers of the present disclosure are also stable at temperatures of up to about 325° F. in some embodiments. Without wishing to be limited to any particular theory, it is believed that the presence of the sulfonate moiety enhances the stability of the relative permeability modifiers of the present disclosure such that they perform well when exposed to elevated temperatures, such as those encountered in a subterranean formation, over long periods of time.

The hydrophobically-modified hydrophilic polymers of the relative permeability modifiers of the present disclosure may be polymers of at least one hydrophilic monomer and at least one hydrophobically modified hydrophilic monomer. In some embodiments, the relative permeability modifiers of the present disclosure can be prepared from a variety of hydrophilic monomers. Examples of hydrophilic monomers which may be used in accordance with the present disclosure include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, vinyl pyrrolidone, hydroxyethyl acrylate, and any combination thereof. The relative permeability modifiers of the present disclosure can be prepared from a variety of hydrophobically modified hydrophilic monomers. Examples of hydrophobically modified hydrophilic monomers that may be used in accordance with the present disclosure include, but are not limited to, alkyl acrylates, alkyl methacrylates, alkyl acrylamides and alkyl methacrylamides wherein the alkyl radicals have from about 2 to about 25 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 2 to about 25 carbon atoms and alkyl dimethylammonium-propylmethacrylamide bromide, alkyl dimethylammonium propylmethacrylamide chloride and alkyl dimethylammonium-propylmethacrylamide iodide wherein the alkyl groups have from about 2 to about 25 carbon atoms, octadecyldimethylammoniumethyl methacrylate bromide, hexadecyldimethyl-ammoniumethyl methacrylate bromide, hexadecyldimethylammoniumpropyl methacrylamide bromide, 2-ethylhexyl methacrylate, hexadecyl methacrylamide, and any combination thereof.

The hydrophobically-modified hydrophilic polymers of the relative permeability modifiers of the present disclosure may be prepared by polymerizing any one or more of the hydrophilic monomers with any one or more of the hydrophobically modified hydrophilic monomers. While the polymerization reaction can be performed in various ways, one example of a procedure for polymerizing water soluble monomers may include the following. Into a 250 mL-3 neck round bottom flask, charge the following: 47.7 g DI water, 1.1 g acrylamide and 0.38 g alkyl dimethylammoniumethyl methacrylate bromide. The solution formed is sparged with nitrogen for approximately 30 minutes, followed by the addition of 0.0127 g of 2,2'-azobis(2-amidinopropane)dihydrochloride. The resulting solution is then heated, with stirring, to 110° F. and held for 18 hours to produce a highly viscous polymer solution.

When the hydrophobically modified hydrophilic monomer is not water soluble, e.g., octadecylmethacrylate, one example of a procedure for polymerization that may be utilized is the following: into a 250 mL-3 neck round bottom flask, charge the following: 41.2 g DI water and 1.26 g acrylamide. The solution formed is sparged with nitrogen for approximately 30 minutes, followed by the addition of 0.06 g of octadecyl methacrylate and 0.45 g of a cocoamidopropyl betaine surfactant. The mixture is stirred until a homogeneous, clear solution is obtained followed by the addition of 0.0055 g of 2,2'-azobis(2-amidinopropane)dihydrochloride. The resulting solution is then heated, with stirring, to 110° F. and held for 18 hours to produce a highly viscous polymer solution.

In addition, the polymerization procedure may employ a hydrocarbon reaction medium instead of water. In this case, appropriate surfactants are used to emulsify the hydrophilic/hydrophobic monomers, and the product is obtained as an oil external/water internal emulsion.

Suitable polymers prepared as described above have estimated molecular weights of from about 250,000 to about 3,000,000 kiloDaltons (kDa) and have mole ratios of the hydrophilic monomer(s) to the hydrophobically modified hydrophilic monomer(s) of from about 99.98:0.02 to about 90:10. Suitable polymers having molecular weights and mole ratios in the ranges set forth above include, but are not limited to, an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer. In certain embodiments, an acrylamide/octadecyl dimethylammoniumethyl methacrylate bromide copolymer having a mole ratio of hydrophilic monomer to hydrophobically modified hydrophilic monomer of 96:4 may be used in accordance with the present disclosure. In certain embodiments, a dimethylaminoethyl methacrylate/hexadecyldimethylammoniumethyl methacrylate bromide copolymer may be used in accordance with the present disclosure. One example of a suitable commercially available polymer that may be used in accordance with the present disclosure is sold under the trade name "HPT-1" by Halliburton Energy Services, Houston, Tex.

To form the relative permeability modifiers of the present disclosure, an anionic sulfonate moiety may be added by a conjugate addition reaction to the polymers described above. In certain embodiments, when the polymer is a hydrophobically modified polyDimethylaminoethyl methacrylate, the relative permeability modifiers of the present disclosure may be formed by the following reaction:

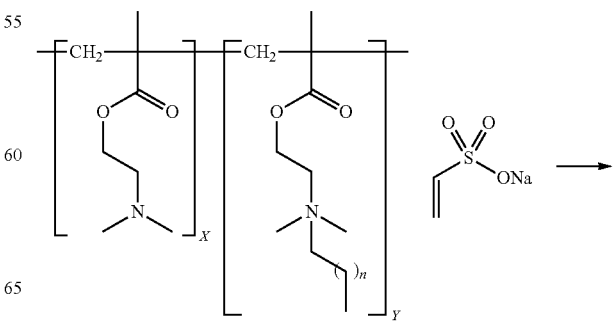

-continued

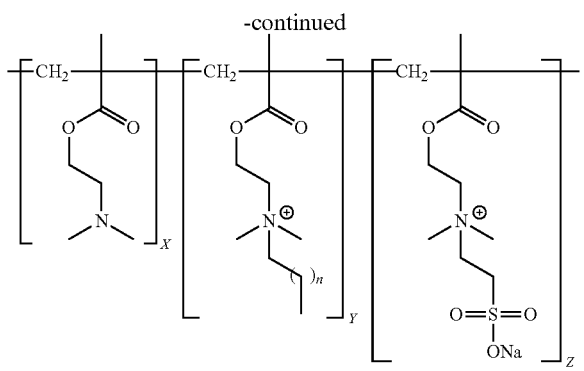

The reaction shown above yields one example of a relative permeability modifier of the present disclosure, wherein X is an integer from 1500 to 20,000, Y is an integer from 25 to 320, Z is an integer from 25 to 430, and n is an integer from 2 to 25. The ranges of X, Y, and Z are dependent upon the molecular weight of the hydrophobically-modified hydrophilic polymer. The hydrophobically-modified hydrophilic polymers that are useful in accordance with the present disclosure generally have a molecular weight from about 250,000 kDa to about 3,000,000 kDa. In certain embodiments, the portion of the relative permeability modifier reaction product indicated with subscript Y above (hydrophobically-modified polyDimethylaminoethyl methacrylate) should be present in the relative permeability modifier in an amount of from about 0.5 mol % to about 30 mol %. In certain embodiments, the portion of the relative permeability modifier reaction product shown with subscript Z above (polyDimethylaminoethyl methacrylate functionalized with sulfonate moiety) should be present in the relative permeability modifier in an amount of from about 0.5 mol % to about 30 mol %.

The sulfonate moiety may generally be present in the relative permeability modifiers of the present disclosure in an amount of from about 0.5 mol % to about 30 mol %. As indicated by the reaction above, the functionalization of the polymer with the sulfonate moiety quarternizes a nitrogen present on the polymer, thereby resulting in a charge on the nitrogen. The sulfonate moiety of the relative permeability modifiers of the present disclosure may be any salt or ester of a sulfonic acid. One example of a sulfonate that may be reacted with a hydrophobically-modified hydrophilic polymer to form the relative permeability modifiers of the present disclosure includes, but is not limited to, sodium vinyl sulfonate.

In certain embodiments, the relative permeability modifiers of the present disclosure may be introduced into a subterranean formation as part of a treatment fluid to treat a subterranean formation. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The relative permeability modifiers of the present disclosure may be introduced into a subterranean formation to treat a water and hydrocarbon producing formation to reduce the water permeability of the formation without substantially reducing the hydrocarbon permeability of the formation. In certain embodiments, the treatment fluids comprising relative permeability modifiers may be introduced into a subterranean formation using one or more pumps. In certain embodiments, the subterranean formation may be a carbonate formation or reservoir that includes a carbonate rock surface. In certain embodiments, the relative permeability modifiers of the present disclosure may be introduced into a subterranean formation to be treated so that the relative permeability modifier attaches to adsorption sites on the surfaces within the porosity of the formation. In certain embodiments, the surfaces may be carbonate rock surfaces.

The treatment fluids used in the methods of the present disclosure may comprise any base fluid known in the art, including aqueous fluids, non-aqueous fluids, and any combinations thereof. Base fluids that may be useful in accordance with the present disclosure may be any suitable fluid that does not adversely affect the properties of the relative permeability modifiers and that may be used for introducing the relative permeability modifiers into a subterranean formation. Aqueous fluids that may be suitable for use in accordance with the present disclosure may comprise water from any source. Examples of suitable aqueous fluids include, but are not limited to, fresh water, deionized water, brine, seawater, aqueous salt solutions, and any combination thereof. In certain embodiments, the aqueous fluid may be an aqueous salt solution containing one or more salts in an amount of from about 2% to about 10% by weight of the solution. Examples of suitable salts that may be utilized in the aqueous salt solution include, but are not limited to, potassium chloride, sodium chloride, ammonium chloride, and calcium chloride. Examples of non-aqueous fluids that may be suitable for use in accordance with the present disclosure include, but are not limited to, oils, hydrocarbons, organic liquids, and the like.

In certain embodiments, the relative permeability modifiers of the present disclosure may be present in the treatment fluid in an amount of from about 100 parts per million (ppm) to about 15,000 ppm. In certain embodiments, the relative permeability modifiers of the present disclosure may be present in the treatment fluid in an amount of from about 1500 ppm to about 2000 ppm.

In certain embodiments, the treatment fluid may also include a surfactant to facilitate the flow of the treatment fluid into a subterranean formation. Such surfactants include cationic surfactants, anionic surfactants, zwitterionic surfactants and non-ionic surfactants, numerous examples of each of which are known to one of ordinary skill in the art. The surfactant may be included in the treatment fluid in an amount of from about 0.1% to about 2% by weight of the base fluid. In certain embodiments, the surfactant may be included in the treatment fluid in an amount of from about 0.5% to about 1% by weight of the base fluid. Illustrative examples of surfactants include, without limitation, ethoxylated nonyl phenol phosphate esters, alkyl phosphonates, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

In certain embodiments, the density of the treatment fluid can be adjusted, among other purposes, to focus the treatment on the lower intervals of a formation. In certain embodiments, the pH of the treatment fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

In certain embodiments, the treatment fluids used in accordance with the methods of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, additional viscosifiers, breakers, weighting agents, resins, wetting agents, coating enhancement agents, filter cake removal agents, antifreeze agents (e.g., ethylene glycol), and the like. A person skilled in the art, with the benefit of this disclosure, will recognize the types of additives that may be included in the treatment fluids of the present disclosure for a particular application.

In certain embodiments, after the relative permeability modifiers of the present disclosure are introduced into a subterranean formation, an after-flush of a hydrocarbon may be introduced into the formation. Although not required for the relative permeability modifiers of the present disclosure to be effective, the hydrocarbon after-flush in the formation may facilitate the subsequent flow of hydrocarbons through the formation.

In certain embodiments, the relative permeability modifiers of the present disclosure may reduce the water permeability of the portion of the subterranean formation by at least about 80%. In certain embodiments, the reduction in water permeability may be at least about 85%. In certain embodiments, it may be at least about 90%. In certain embodiments, it may be at least about 95%. In certain embodiments, it may be at least about 98%. In certain embodiments, it may be at least about 99%. Measurement of the water permeability reduction of a subterranean formation can be determined by measuring the permeability reduction of a core sample obtained from the subterranean formation. An untreated core sample has no water permeability reduction.

An embodiment of the present disclosure is a relative permeability modifier comprising: a polymer of at least one hydrophilic monomer and at least one hydrophobically modified hydrophilic monomer, wherein the polymer comprises a sulfonate moiety.

Another embodiment of the present disclosure is a method comprising: providing a treatment fluid comprising a base fluid and a relative permeability modifier comprising a polymer of at least one hydrophilic monomer and at least one hydrophobically modified hydrophilic monomer, wherein the polymer comprises a sulfonate moiety; introducing the treatment fluid into at least a portion of a subterranean formation.

Another embodiment of the present disclosure is a method comprising: introducing into at least a portion of a subterranean formation a relative permeability modifier comprising a polymer of at least one hydrophilic monomer and at least one hydrophobically modified hydrophilic monomer, wherein the polymer comprises a sulfonate moiety; and allowing the relative permeability modifier to attach to adsorption sites on surfaces within the subterranean formation, wherein the relative permeability modifier reduces the water permeability of at least a portion of the subterranean formation.

To facilitate a better understanding of the present disclosure, the following examples of preferred embodiments are given. In no way should the following examples be read to limit, or to define, the scope of the invention.

EXAMPLES

Preparation of the Relative Permeability Modifier

The following example demonstrates the preparation of on example of a relative permeability modifier of the present disclosure. Sodium vinylsulfonate (30 mol %) was added to a 3.0% active solution of HPT-1 (available from Halliburton Energy Services, Houston, Tex.). The homogeneous reaction solution was allowed to stir for 8-12 h at 130° F. The reaction solution was then diluted and employed as a relative permeability modifier without any further purification.

Figure 2:
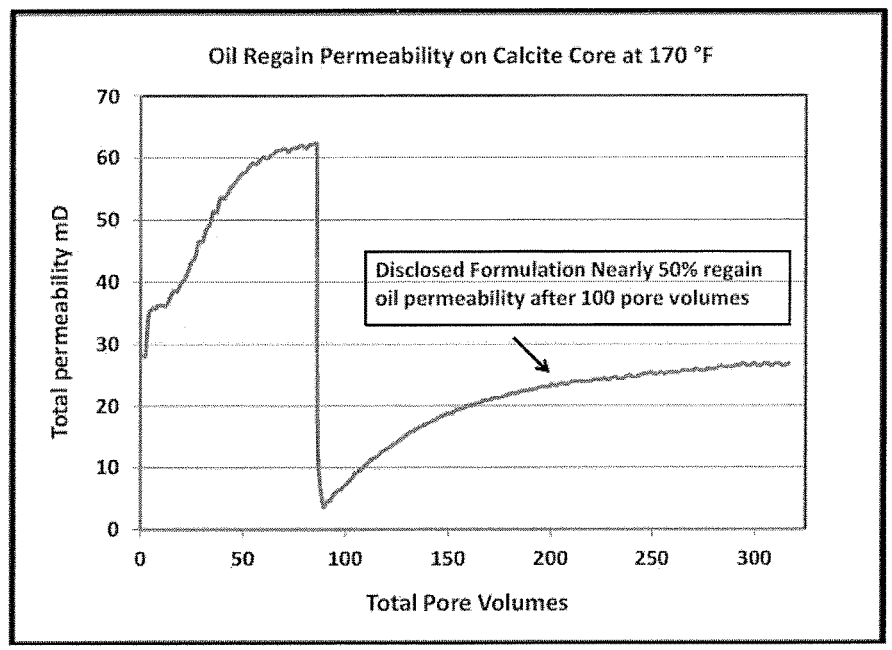
FIG. 2 is a graph illustrating regain oil permeability on 99% calcite core at 170° F. for one example of a relative permeability modifier of the present disclosure.

Evaluation of the Relative Permeability Modifier,

Standard core flow tests were performed on 99% calcite cores obtained from Kocurek Industries. A 1500 ppm solution of the relative permeability modifier prepared as described above (RPM formulation) and a 2000 ppm WaterWeb® solution were prepared and coreflow tests were performed. As shown in Table 1, the modification to HPT-1 with a sulfonate moiety drastically improves the material's performance on pure calcite resulting in only 6% brine permeability after flowing for 2500 pore volumes. In comparison, subjecting a 2000 ppm WaterWeb® formulation to a pure calcite core resulted in 100% regained brine permeability after only flowing for 65 pore volumes (Table 1). These results are also depicted in FIG. 1 in which the performance of the WaterWeb® formulation is less than desirable providing virtually no reduction to brine permeability. However, the relative permeability modifier with a sulfonate moiety continued to reduce the permeability to brine over an extended period (7 days). Regarding regain oil permeability, as depicted in FIG. 2, when a core is treated with the relative permeability modifier of the present disclosure and oil is subsequently flowed through the treated core, this resulted in nearly 50% oil regain permeability after flowing only 100 pore volumes.

TABLE 1

Regain Brine Permeability for RPM Formulation Compared to Halliburton Waterweb ® on Carbonate

| Polymeric Material | Material loading (ppm) | $K_i$ mD | $K_f$ mD | Total Pore Volumes | % K reduction |
|---|---|---|---|---|---|
| RPM | 1500 | 100 | 6 | 2500 | 94 |
| WaterWeb | 2000 | 130 | 130 | 65 | 0 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A relative permeability modifier comprising:
a polymer of at least one hydrophilic monomer and at least one hydrophobically modified hydrophilic monomer, wherein the polymer comprises a sulfonate moiety and wherein the relative permeability modifier comprises the following structure:

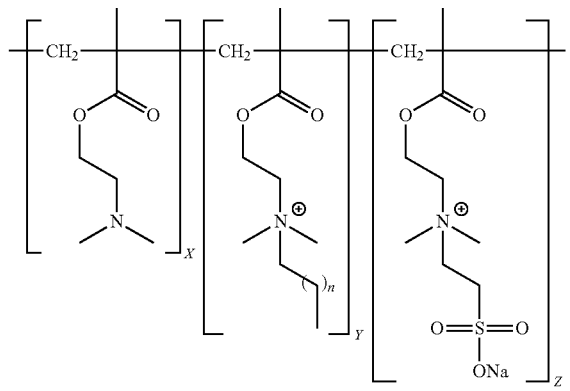

wherein X is an integer from 1500 to 20,000, Y is an integer from 25 to 320, Z is an integer from 25 to 430, and n is an integer from 2 to 25.

2. The relative permeability modifier of claim 1, wherein the hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, hydroxyethyl acrylate, and any combination thereof.

3. The relative permeability modifier of claim 1, wherein the hydrophobically modified hydrophilic monomer is selected from the group consisting of an alkyl acrylate, an alkyl methacrylate, an alkyl acrylamide, and an alkyl methacrylamide, wherein the alkyl radicals have from about 2 to about 25 carbon atoms; alkyl dimethylammoniumethyl methacrylate bromide, alkyl dimethylammoniumethyl methacrylate chloride, and alkyl dimethylammoniumethyl methacrylate iodide, wherein the alkyl radicals have from about 2 to about 25 carbon atoms; alkyl dimethylammoniumpropylmethacrylamide bromide, alkyl dimethylammonium propylmethacrylamide chloride, and alkyl dimethylammonium-propylmethacrylamide iodide, wherein the alkyl groups have from about 2 to about 25 carbon atoms; octadecyldimethylammoniumethyl methacrylate bromide; hexadecyldimethyl-ammoniumethyl methacrylate bromide; hexadecyldimethylammoniumpropyl methacrylamide bromide; 2-ethylhexyl methacrylate; hexadecyl methacrylamide; and any combination thereof.

4. A method comprising:
providing a treatment fluid comprising a base fluid and a relative permeability modifier comprising a polymer of at least one hydrophilic monomer and at least one hydrophobically modified hydrophilic monomer, wherein the polymer comprises a sulfonate moiety and wherein the subterrean formation is a carbonate formation; and
introducing the treatment fluid into at least a portion of a subterranean formation.

5. The method of claim 4 wherein the base fluid is selected from the group consisting of an aqueous fluid, a non-aqueous fluid, and any combination thereof.

6. The method of claim 4 wherein the hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, hydroxyethyl acrylate, and any combination thereof.

7. The method of claim 4 wherein the hydrophobically modified hydrophilic monomer is selected from the group consisting of an alkyl acrylate, an alkyl methacrylate, an alkyl acrylamide, and an alkyl methacrylamide, wherein the alkyl radicals have from about 2 to about carbon atoms; alkyl dimethylammoniumethyl methacrylate bromide, alkyl dimethylammoniumethyl methacrylate chloride, and alkyl dimethylammoniumethyl methacrylate iodide, wherein the alkyl radicals have from about 2 to about 25 carbon atoms; alkyl dimethylammonium-propylmethacrylamide bromide, alkyl dimethylammonium propylmethacrylamide chloride, and alkyl dimethylammonium-propylmethacrylamide iodide, wherein the alkyl groups have from about 2 to about 25 carbon atoms; octadecyldimethylammoniumethyl methacrylate bromide; hexadecyldimethyl-ammoniumethyl methacrylate bromide; hexadecyldimethylammoniumpropyl methacrylamide bromide; 2-ethylhexyl methacrylate; hexadecyl methacrylamide; and any combination thereof.

8. The method of claim 4 wherein the treatment fluid is introduced into the subterranean formation using one or more pumps.

9. The method of claim 5 wherein the relative permeability modifier is present in the treatment fluid in an amount of from about 100 parts per million to about 15,000 parts per million.

10. The method of claim 4, wherein the relative permeability modifier comprises the following structure:

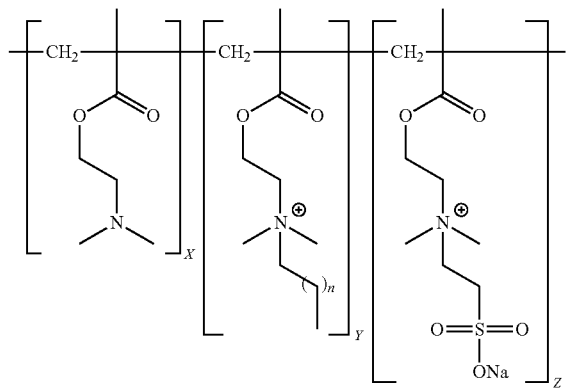

wherein X is an integer from 1500 to 20,000, Y is an integer from 25 to 320, Z is an integer from 25 to 430, and n is an integer from 2 to 25.

11. A method comprising:
introducing into at least a portion of a subterranean formation a relative permeability modifier comprising a polymer of at least one hydrophilic monomer and at least one hydrophobically modified hydrophilic monomer, wherein the polymer comprises a sulfonate moiety and wherein the subterranean formation is a carbonate formation; and
allowing the relative permeability modifier to attach to adsorption sites on surfaces within the subterranean formation, wherein the relative permeability modifier reduces the water permeability of at least a portion of the subterranean formation.

12. The method of claim 11 wherein the hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide, hydroxyethyl acrylate, and any combination thereof.

13. The method of claim 11 wherein the hydrophobically modified hydrophilic monomer is selected from the group consisting of an alkyl acrylate, an alkyl methacrylate, an alkyl acrylamide, and an alkyl methacrylamide, wherein the alkyl radicals have from about 2 to about carbon atoms; alkyl dimethylammoniumethyl methacrylate bromide, alkyl dimethylammoniumethyl methacrylate chloride, and alkyl dimethylammoniumethyl methacrylate iodide, wherein the alkyl radicals have from about 2 to about 25 carbon atoms; alkyl dimethylammonium-propylmethacrylamide bromide, alkyl dimethylammonium propylmethacrylamide chloride, and alkyl dimethylammonium-propylmethacrylamide iodide, wherein the alkyl groups have from about 2 to about 25 carbon atoms; octadecyldimethylammoniumethyl methacrylate bromide; hexadecyldimethyl-ammoniumethyl methacrylate bromide; hexadecyldimethylammoniumpropyl methacrylamide bromide; 2-ethylhexyl methacrylate; hexadecyl methacrylamide; and any combination thereof.

14. The method of claim 11, wherein the relative permeability modifier comprises the following structure:

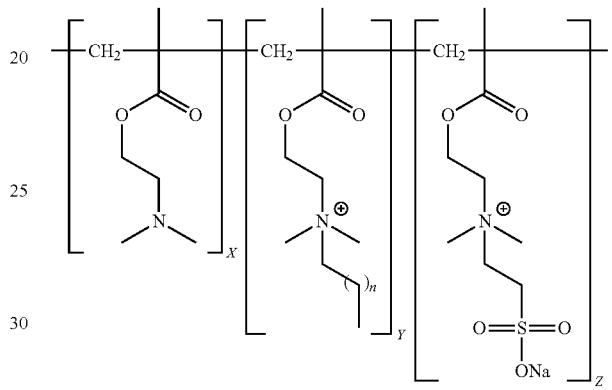

wherein X is an integer from 1500 to 20,000, Y is an integer from 25 to 320, Z is an integer from 25 to 430, and n is an integer from 2 to 25.

15. The method of claim 11, wherein the relative permeability is introduced into the subterranean formation as part of a treatment fluid.

16. The method of claim 15 wherein the treatment fluid comprises an aqueous fluid selected from the group consisting of fresh water, deionized water, brine, seawater, aqueous salt solutions, and any combination thereof.

17. The method of claim 11 further comprising introducing a hydrocarbon liquid or a gas into the subterranean formation.

* * * * *